US009081987B2

(12) United States Patent
Gormish et al.

(10) Patent No.: US 9,081,987 B2
(45) Date of Patent: Jul. 14, 2015

(54) DOCUMENT IMAGE AUTHENTICATING SERVER

(75) Inventors: Michael Gormish, Redwood City, CA (US); Kevin Ridout, Campbell, CA (US)

(73) Assignee: RICOH CO., LTD., Tokyo (JP)

( * ) Notice: Subject to any disclaimer, the term of this patent is extended or adjusted under 35 U.S.C. 154(b) by 1542 days.

(21) Appl. No.: 11/692,834

(22) Filed: Mar. 28, 2007

(65) Prior Publication Data

US 2008/0243898 A1    Oct. 2, 2008

(51) Int. Cl.
| | | |
|---|---|---|
| G06F 21/64 | (2013.01) | |
| G06F 7/00 | (2006.01) | |
| G06F 17/30 | (2006.01) | |
| G06Q 10/10 | (2012.01) | |

(52) U.S. Cl.
CPC ............... G06F 21/64 (2013.01); G06Q 10/10 (2013.01); *G06F 2221/2101* (2013.01)

(58) Field of Classification Search
CPC .. G06F 21/64; G06F 2221/2101; G60Q 10/10
USPC .......................................................... 707/758
See application file for complete search history.

(56) References Cited

U.S. PATENT DOCUMENTS

| | | | | |
|---|---|---|---|---|
| 5,978,475 | A | | 11/1999 | Schneier |
| 7,505,933 | B1 | * | 3/2009 | Gutierrez et al. ............... 705/35 |
| 7,849,053 | B2 | | 12/2010 | Wolff et al. |
| 8,006,094 | B2 | * | 8/2011 | Savitzky et al. ............... 713/178 |
| 8,788,313 | B2 | * | 7/2014 | Schaad ........................ 705/7.27 |
| 2004/0260582 | A1 | | 12/2004 | King |
| 2005/0018840 | A1 | * | 1/2005 | Yung et al. ..................... 380/28 |
| 2005/0226473 | A1 | | 10/2005 | Ramesh |

(Continued)

FOREIGN PATENT DOCUMENTS

| | | |
|---|---|---|
| EP | 1 622 074 | 2/2006 |
| JP | 2003-143139 | 5/2003 |

(Continued)

OTHER PUBLICATIONS

Maniatis et al, "Secure History Preservation Through Timeline Entanglement", 2002.*

(Continued)

*Primary Examiner* — Brannon W Smith
(74) *Attorney, Agent, or Firm* — Blakely, Sokoloff, Taylor & Zafman LLP

(57) ABSTRACT

A document image authenticating server and method for using the same are described. In one embodiment, the method comprises a document receiving interface to capture images of documents associated with one or more workflows and tag the collected document with workflow information indicative of its associated workflow; a first memory to store images of documents captured by the document receiving interface and metadata, the first memory being accessible for verification operations performed with respect to the workflow; a second memory to store a log that includes entries with one or more media identifiers corresponding to the captured images, the second memory being accessible for verification operations performed with respect to the workflow; a first unit to generate log data corresponding to the images associated with workflows captured at the document receiving interface and to store the log data in the log; and a second unit to provide information about the log to another application.

21 Claims, 7 Drawing Sheets

(56) References Cited

U.S. PATENT DOCUMENTS

| | | |
|---|---|---|
| 2006/0010095 A1 | 1/2006 | Wolff et al. |
| 2007/0156672 A1* | 7/2007 | Wolff et al. .................. 707/5 |
| 2008/0201580 A1* | 8/2008 | Savitzky et al. ............ 713/189 |
| 2009/0178144 A1* | 7/2009 | Redlich et al. ................ 726/27 |
| 2013/0276058 A1* | 10/2013 | Buldas et al. .................. 726/2 |

FOREIGN PATENT DOCUMENTS

| | | |
|---|---|---|
| JP | 2005148917 | 6/2005 |
| WO | WO 2006/028920 | 3/2006 |
| WO | WO 2006/127135 | 11/2006 |

OTHER PUBLICATIONS

Chebotko et al, "Scientific Workflow Provenance Metadata Management Using an RDBMS-based RDF Store", 2007.*

European Search Report, Application No. 08153387.9-1238, Mailed Sep. 29, 2008.

Toyoshima, Hisashi and Miyazaki, Kunihiko, "Hysteresis Signature and Its Related Technologies to Maintain the digital Evidence for Network Activities in Future Society", Journal of the National Institute of Information and Communications Technology, vol. 52, Nos. 1/2, 2005, pp. 191-201.

Japanese Office Action for Japanese Patent Application 2008-084943, (Mar. 27, 2012), 3 pages.

Kusaba, Nobuo, "The View of the J-Sox Law Measure", Solution IT vol. 18 No. 5, Japan, Ric Telecom, May 1, 2006, vol. 18 No. 5, pp. 59-63 (8 pages total).

Japanese Office Action for related Japanese Patent Application No. 2008-084943, Jun. 12, 2012, 2 pgs. *No translation provided*.

* cited by examiner

DOCUMENT IMAGE AUTHENTICATING SERVER

FIELD OF THE INVENTION

The present invention relates to the field of digital object distribution; more particularly, the present invention relates to associating information using document logs for use in regulatory compliance and other regulatory settings.

BACKGROUND OF THE INVENTION

Sarbanes-Oxley and several other regulations require compliance by businesses. These include, for example, HIPAA, OSHA, SB 1386, NASD 2711, and Gramm-Leach-Bliley.

The traditional method of proving compliance with a business procedure is to have a "paper trail." For example, in order to establish that an expense was "real," a receipt is stored. In order to justify a check to a vendor, there may be a signed purchase request, quotes from other vendors, a purchase order, a signed packing slip, and an invoice. These paper records are typically organized in some fashion, stapled, placed in folders, and organized in filing cabinets. If the organizational method is good, the paper documents can be later retrieved. Paper records can be filed in only one way, e.g. by check number, or by vendor, but not both. Thus, their retrieval by another method requires access to an index, e.g. a paper or electronic record that connects check numbers with payees.

Paper has a real advantage of being hard to duplicate. Even with a high quality printer, it is difficult to duplicate the paper stock and preprinted logos from an invoice for example. Likewise, it is difficult to duplicate a handwritten signature on a packing-list. However, anyone with a modest amount of skill with an image processing program like Adobe's Photoshop™ can modify an electronic copy of a document. It is easy for example to change the amount on an invoice or copy a scan of a signature from one document to another. Thus, tools that verify the authenticity of an electronic document are valuable in that they maintain or improve on the "trail" available with paper.

The past prevalence of paper means that almost all business processes are verified by some image. Real paper may have been replaced by an electronic PDF; however, it is still the visual record that is of interest. Even in the case where the official document is an Excel spreadsheet, the compliance "controls" are the values computed at various cells within the worksheet, which are labeled so they may be interpreted visually.

Electronic files (e.g., Word, Excel, PDF, etc.) may have formulas and other execution that alter the data and the presentation, e.g. different amounts can appear at different times in a spreadsheet. There may be different presentations for different devices or different users. Capturing, preserving, and authenticating the actual image presented to the human user (whether on paper or displayed on a monitor) is the only way to know what information the human had.

Many document management systems have been proposed and implemented in the past. These document management systems include systems that store documents and handle the coordination of requests with responses. However, these systems do not cut across organizational boundaries and do not perform the synchronization that is necessary.

Portals, Content Management systems, and Wikis handle bit-map images, allow search on tags, sometimes search on recognized file types (e.g., power points slides, graphics, text only).

Version control systems like ClearCase, SourceSafe, CVS, Subversion, and GIT detect changes in a family of documents and keep track of the order of modification. The "GIT" system uses hashes to identify changed files and directories. Some version control systems are integrated with a "workflow" for example to run a set of regression tests on the changed source code. Such systems do not have a visual representation or notion of control points.

Intrusion Detection systems like TripWire determine if any of a set of files on a computer system has been changed using cryptographic hashes.

A Web log is an online document management tool used to record information. Web logs use a client-server framework to permit the addition or subtraction of content from one or more client locations to a server that hosts the web log. Because one server hosts each web log, web logs are typically anchored to a particular HTTP location.

U.S. patent application Ser. No. 10/887,998, entitled "Synchronizing distributed work through document logs," filed Jul. 9, 2004 by Wolff, Gregory J., et al., (Publication No. 20060010095) discloses synchronizing distributed work through the use of document logs. As disclosed, metadata entries are added to a set that is associated with a digital object, such as a document. The metadata entries are accessed using unique identifiers that reference the metadata entries. In one embodiment, each unique identifier is based on the contents of the metadata.

SUMMARY OF THE INVENTION

A document image authenticating server and method for using the same are described. In one embodiment, the server comprises a document receiving interface to capture images of documents associated with one or more workflows and tag the collected document with workflow information indicative of its associated workflow; a first memory to store images of documents captured by the document receiving interface and metadata, the first memory being accessible for verification operations performed with respect to the workflow; a second memory to store a log that includes entries with one or more media identifiers corresponding to the captured images, the second memory being accessible for verification operations performed with respect to the workflow; a first unit to generate log data corresponding to the images associated with workflows captured at the document receiving interface and to store the log data in the log; and a second unit to provide information about the log to another application

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
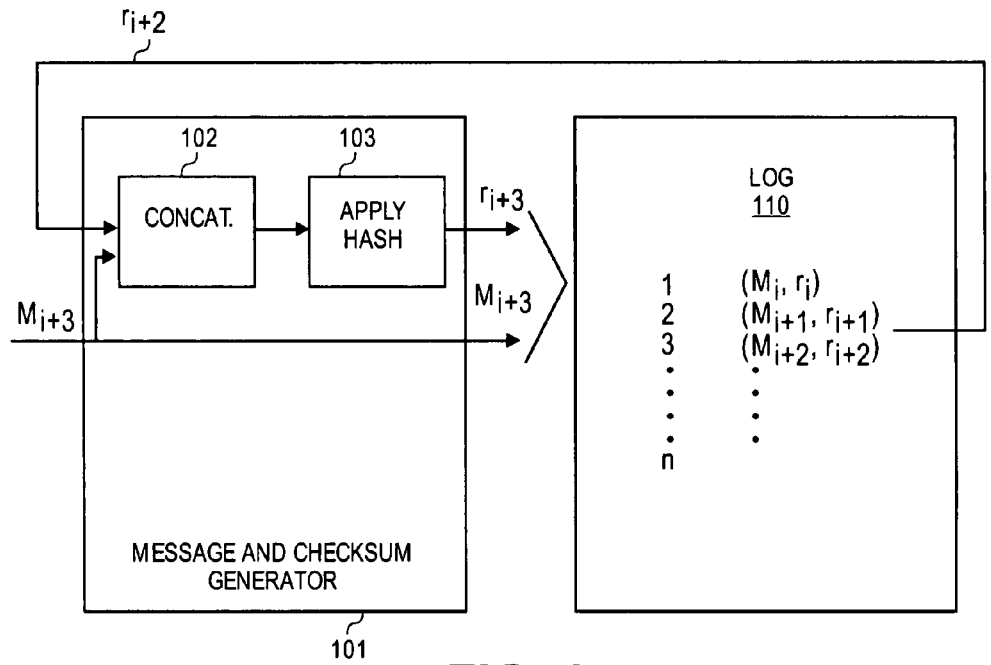
FIG. 1 illustrates generating and storing an entry in a log.

A method and apparatus for processing document images is described. In one embodiment, the use of logs and the logging technology disclosed herein may be used as a tool in the regulatory environment, such as, for example, corporate accounting. More specifically, in one embodiment, a server assists corporations with compliance to Sarbanes-Oxley regulations and other laws and regulations. In one embodiment, assistance is provided with internal business procedures. In particular, this server may be used when "auditing" or "verifying compliance" with these procedures.

In one embodiment, the authenticating, or "SOX," server described herein accepts tagged document images from a number of sources, stores a verifiable log of those documents, exchanges information about its status with one or more other servers, and provides tools to verify the existence of documents at particular times.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An apparatus and infrastructure for capturing image data from many sources, associating the images with the workflow, control point, and workflow instance, capturing other metadata (structured and unstructured), and logging and authenticating the integrity and timing of all the data and providing access to the data is described.

Media Identifiers, Sequential Logs, and Entangling Media Identifiers for Physical and Electronic Items Many of the inventions described here-in require the ability to refer to a document, video, song, piece of paper, or electronic file by an identifier. For purposes herein, the document, video, song, piece of paper, or electronic file is referred herein to as the media. An identifier used to identify the media is called a media identifier and, in one embodiment, is a string of bytes.

There are several properties of the association between the media and the media identifier which are useful in the inventions: A) it is beneficial that anyone who has the media can determine an identical media identifier; B) it is beneficial that it is difficult for anyone to find two distinct pieces of media that have the same media identifier; C) it is beneficial that the media identifier does not reveal anything about the content of the media; and D) it is beneficial that any change to the media would result in a different identifier.

There are multiple ways to assign an identifier to a piece of media. For an electronic file, in one embodiment, the identifier is generated by applying a cryptographic hash function on the bytes of the file. Cryptographic hash functions are well known in the security literature and have been standardized in various federal and international standards, and software toolkits.

Cryptographic hash functions meet the properties described above so well that we will sometimes refer to the process of determining an identifier for a piece of media as "hashing" and sometimes refer to the media identifier as a "hash," even if a different technique is used to form the identifier.

There are other ways to assign identifiers to files. For example, a server could keep a copy of every file and assign a previously unused string randomly to each new file. This method works very well for properties B, C, and D, but only meets property A if everyone can contact the server, and the server cannot be changed, even if taken off-line by, for example, by a denial of service attack.

It is also possible to use functions that are simpler than cryptographic hashes to identify files. For example, a simple checksum can be used on a file, and the result used as a media identifier. This meets properties A and C, but not property B. Some changes result in a different checksum but a few do not, so property D is not always met. However, for some applications these properties may be less important. Also some applications may have very structured data, such that it is difficult to find two pieces of media that both have the same checksum and follow the rules of the structured data.

Pieces of paper can be assigned an identifier, for example, by scanning the paper and computing a cryptographic hash of the scanned file that results. However, because of noise in the scanning process, different scans of the paper often lead to different electronic files, and thus different identifiers. For this reason it is sometimes convenient to affix a barcode or other machine readable identifier (e.g., a RFID tag) to a piece of paper or other physical device. Use of a machine readable ID makes it easy for anyone to get the same identifier; however, it is also possible to attach the same ID value to different media, so property B is not well met in this case.

In one embodiment, to overcome the weakness of machine readable ID's, a form of "finger printing" is used to identify physical media. Since finger printing associates values with the physical device, it can be very hard or impossible to make a new "finger" or piece of paper with the same finger print. However, in many cases, the "finger print" reveals something about the physical media, also it may be possible to change the physical media slightly without changing the finger print. Thus, in such a case, properties C and D might not be held perfectly.

There may be multiple identifiers associated with a single piece of media. For example, there could be an identifier formed by using the SHA1 cryptographic hash function on the media, and an identifier formed by using the SHA256 or MD5 cryptographic hashes on the same media. In one embodiment, keyed-hash message authentication codes or HMAC are used to compute media identifiers. These message authentication codes like HMAC-MD5 or HMAC-SHA1 can be better than the underlying cryptographic hash functions (MD5 and SHA1) for properties B, C, and D because they use a key which can change. However, property A is more difficult with message authentication codes because in order to compute the same hash, all places computing it must have access to the key.

There can be identifiers associated with different formats of the same data. For example, the hash of a file, and the hash of the same file compressed losslessly with ZIP, are different identifiers, but they are associated with the same final data.

There can also be identifiers formed for part of the media. For example, in the case of video, there could be an identifier formed for each different frame. Because of packet loss in a network, two people watching the same video might not end up with the same file, and thus they would be unable to compute the same identifier. However, each person would receive several identical frames of the video. So if they computed a hash of each frame they received, they could determine that they were watching the same video because of the large number of identical hashes.

To continue the same example, two people watching the same video might watch it at different resolutions, in this case no two frames will have the same hash. However, if the video was stored in a scalable method, e.g. JPEG 2000 part 3, then the lowest resolution portion of the video may be the same for both viewers, and common hashes could be determined.

When video is not stored in a scalable format, a server typically stores multiple versions of a video at different resolutions. The server can thus compute a hash of all frames of all resolutions it has stored, and thus any frame received completely by a client can be hashed and the hashes later compared with those on the server to identify the video.

In addition to video, there are other types of media that may be partially transmitted. For example, part of a large XML document may be requested. The request may be, for example, by an XPATH query. The portion of the document received by the client is different from the whole document available at the server. However, it is possible to compute hashes for portions of the documents (e.g., subtrees of the XML document) or even contents of particular nodes in the XML document. A client with a subset of the XML document can compute hashes on the subtrees and nodes that it receives, and these can be matched against a large list of hashes at the server.

For any particular media, relevant subsets of the data can often be determined and these subsets can be hashed in addition to the hash of the complete media.

In some cases, the data is processed so that the portion delivered does not actually appear in the data as a whole. For example, a color image might be converted to grayscale and then delivered, or the sum of entries in a spreadsheet might be computed and reported. However, if the data exists at two places (e.g. the server and client), then even if only modified data is delivered, it is possible for both server and client to record hashes of the modified data and the association between the received data and it's source can be made at a later time.

In some cases, the "server" might not have the modified data initially. For example, if an intermediate processing device performs the computation on the data. However, if the type of computation is known, it could be later run on the server to associate the original media with the received data. For example, a server might send a high bit rate video, but due to network congestion, this may be truncated by removing a quality layer at an intermediate router. A client thus receives a medium bit-rate video that can be hashed. In order to determine the same hashes, the server runs the hash on the high rate video without the quality layer that the router discarded.

Sequential Logs

Many of the inventions described herein involve recording a sequence of events. The record of events is referred to as a "log" or "log-file," similar to the relationship with a log book used to record the events of a ship or aircraft, and the log files used to record the actions taken on computer systems. In one embodiment, the logs have a property that it is easy to add a new record to the end, but difficult to change a record already in the log without such a change being easily detected.

Unlike a traditional "log book" or "log file", in one embodiment, it is desirable for the log not to disclose much information about the event being recorded. In this way, the log file may be made available to a large number of people or systems so that some records can be checked, but the content of most of the records can remain secret.

There are several possible implementations of a log which have different levels of performance with respect to the goals of easy to add, hard to change, and partial disclosure of information.

A conceptually simple way to implement a log is a tamper proof write once memory. Each record is written in order into the memory. This meets the goal of easy to add and hard to modify, but it is difficult to remotely verify that the "tamper proof" memory has not been changed.

One method of implementing a log is to create a sequence of records where each record includes a hash of some information from the previous record, and the contents of the current record. For example, let the message portion of the ith record be called $M_i$ and a rolling checksum called $r_i$. This rolling checksum for the ith record can be computed as:

$$r_i = \text{hash}(r_{i-1} \cdot M_i)$$

where the message and the previous checksum are concatenated (represented by the ".") and provided to the hash function. The log in this case consists of a sequence of messages and checksums $(M_i, r_i)$. In one embodiment, an addition to the log may be made by taking the last checksum and the current message, concatenating the two, and computing the hash. This is shown in FIG. 1. Referring to FIG. 1, to create a new message and checksum pair, a message and checksum generator 101 receives a new message, $M_{i+3}$ and the checksum $r_{i+2}$ of the last entry in log 110. A concatenation module 102 concatenates the previous checksum $r_{i+2}$ with the message $M_{i+3}$. Hash module 103 applies a hash function, as described herein, to produce the next checksum $r_{i+3}$. Message $M_{i+3}$ and checksum $r_{i+3}$ are then stored in log 110. Note that message and checksum generator 101 may comprise a processing unit (e.g., a microprocessor) with concatenation module 102 and hash unit 103 being software modules of instructions that are executed by the processing unit. Alternatively, these functions could be implemented in hardware.

If one of the messages in the log is modified, or one of the checksums in the log is modified, then the subsequent checksum will be incorrect. Thus modifying a record would require changing the message and all subsequent checksums. If one of the checksums is copied and stored elsewhere, then any modification prior to that checksum can be detected. If a modification is made without updating the checksums, then recomputing the hashes for the rolling checksums in the log reveals the error. If the hashes are all changed so the log is self consistent, then they won't match the externally saved value.

As set forth above, the hash function could be a simple checksum, be preferably is a cryptographic hash function.

This method meets most of the goals for the log, but there are variations which provide additional benefits.

One modification is to store the hash of the message rather than the message itself in the log. Thus, if $m_i$ is defined as:

$$m_i = \text{hash}(M_i),$$

then a log can be defined as a sequence of $(m_i, r_i)$, with $r_i$ being a checksum of only the message hash and the previous checksum:

$$r_i = \text{hash}(r_{i-1} \cdot m_i).$$

Figure 2:
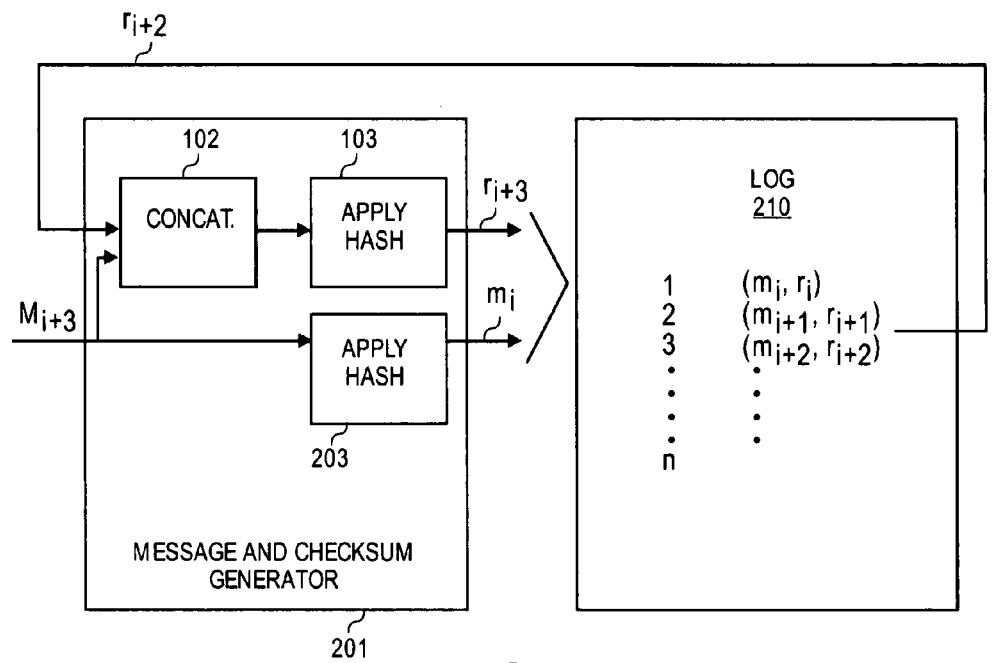
FIG. 2 illustrates generating and storing a hash of media in a log.

This is shown in FIG. 2. Referring to FIG. 2, to create a new message and checksum pair, a message and checksum generator 201 receives a new message, $M_{i+3}$ and the checksum $r_{i+2}$ of the last entry in log 210. A concatenation module 102 concatenates the previous checksum $r_{i+2}$ with the message $M_{i+3}$. Hash module 103 applies a hash function, as described herein, to produce the next checksum $r_{i+3}$. Hash module 203 applies a hash function to message $M_{i+3}$ to produce hashed message $m_{i+3}$. In one embodiment, the hash function applied by hash module 203 is the same as the hash function applied by hash module 103; alternatively, the hash function applied by hash module 203 is not the same as the hash function applied by hash module 103. Hashed message $m_{i+3}$ and checksum $r_{i+3}$ are then stored in log 210. Message and checksum generator 101 may comprise a processing unit (e.g., a microprocessor) with concatenation module 102, hash unit 103, hash unit 203 being software modules of instructions that are executed by the processing unit. Alternatively, these functions could be implemented in hardware.

This method has the advantage of producing fixed length records provided that the hash function has a fixed length, which is commonly true. This method has the further advantage of not having any message content in the log. Thus, if the message was some customer information (e.g., a purchase order with name, address, and order information), it would not be desirable to publish the message. However, if the hash used does not reveal information about the message, then the entire sequence of $(m_i, r_i)$ i.e. the log, can be published without publishing this information.

In some cases, it is desirable to have a log with more information than solely the hash of the message. For example, it is often useful to have the time stored in the log or the type of information of the log entry stored in the published log. This makes it easier to search the log for specific records. Thus, if the information in a record that is readable is defined as the "plain text", called $t_i$, then in one embodiment, the log consists of a sequence of $(t_i, m_i, r_i)$, and each checksum, $r_i$ is computed as:

$$r_i = \text{hash}(r_{i-1} \cdot t_i \cdot m_i)$$

This format is quite general because the $t_i$ portion could contain further structure (e.g., always a date and a type and a file name) while the messages could also be structured. Of course, the order of the previous rolling checksum, the current message or message hash, and "plain text" information can be changed, as long as the order is known to all applications needing to generate or verify a checksum.

Another way to provide partial access to information in a log is to encrypt some of the information stored in the log. Suppose the encrypted information for a log is $E_i$, and the hash of $E_i$ is $e_i$. In one embodiment, either $E_i$ or $e_i$ can be stored in the log. Thus, a log entry might consist of $(t_i, m_i, E_i, r_i)$, i.e. a plain text portion, a hash of the message, some encrypted data and a hash of the previous hash in the log and concatenated with the hash of the message. In general, there could be a mix of times and a record might have several plain text portions, several encrypted portions, and several hashes of messages.

In one embodiment, the format for log entries is a set of header "lines" and a body with data, e.g.

Author: gormish
SHA1: 1bff5d8cda307b5f3f3757cb25588a54cfb01ce0
Content-Length: 567
567 bytes of DATA In one embodiment, this type of format is used for http and email. Thus, several well-known headers have been defined and could be used in a log.

Different keys can be used for different encrypted entries or different types of encrypted entries in the log. For example, all entanglement information might be encrypted with one key, all classification values with a different key. If the log is associated with a single document and that document is encrypted, then the entries in the log might be encrypted with the same key as used for the document. That way, anyone with access to the document is also granted access to the information in the log.

In one embodiment, a log supports different multiple rolling hashes or different types of hashes, i.e. hashes computed with different cryptographic hash functions. For example, in one embodiment, the value $r_i$ is as follows:

$$r_i = \text{hash}(r_{i-1} \cdot t_i \cdot m_i)$$

and the value of $t_i$ specifies which hash function was used (e.g., MD5, SHA1, SHA256, etc.). In one embodiment, a log entry with two different rolling checksums has entries like:

$$(t_i, m_i, r_i, s_i)$$

where $r_i$ is computed as:

$$r_i = SHA1(r_{i-1} \cdot t_i \cdot m_i)$$

and $s_i$ is computed as:

$$s_i = SHA256(s_{i-1} \cdot t_i \cdot m_i)$$

This allows the same log to be used with systems that only support one type of hash, and if one hash function is broken, the other hash function may still be valid, and the combination of both is likely to be even harder to break. Other arrangements with logs using two or more hash functions would be apparent to those skilled in the art.

It should be noted that log entries can be added which retrospectively add new hash chains to a log. Suppose a log consists of pairs of messages and rolling hashes $(M_i, r_i)$, with ri=SHA1(ri−1, Mi), with i between 1 and N. New messages can be added to the log which consists of the old messages and a new rolling hash computed with a different hash function. Thus, message N+1 could be the first message concatenated with a rolling checksum computed using a new hash function. In general:

$$M_{N+1} = M_i \cdot s_i$$

where $$s_i = SHA256(s_{i-1}, M_i)$$

This allows the later repair of logs whose hash functions have been compromised, by adding a new hash covering the same material. Any number of hash functions can be applied retrospectively in this fashion, as hash functions are compromised and new functions are discovered.

In one embodiment, a second hash function makes use of the first hash function in its computation. For example, $$s_i = SHA256(s_{i-1} \cdot t_i \cdot m_i \cdot r_i)$$

or $$s_i = SHA256(r_{i-1} \cdot s_{i-1} \cdot t_i \cdot m_i)$$

Storage for a Log

In one embodiment, a log is stored sequentially in a single file. This sort of log is very easy to create because the rolling hash from the last entry is read, and new data is appended to the end of the file. If the entries are fixed length, it is easy to find a specific entry in the file. In many cases, a single file is sufficient especially if the log is for a single document that does not have too many entries.

In some cases, the log may become very long, usually because a record of a common event is being made. If a log is used to accumulate data from multiple sources, there could be several entries per second. In this case, it may be useful to break a log into multiple files, for example, after every 10,000 entries.

In another embodiment, each log entry is stored in a separate file. In this case, a pointer to the most recent entry is used for fast access. In one embodiment, the record has a sequence number inside it, and the most recent record can be determined by examining all record numbers. One technique is to name the file with the rolling hash, and include the rolling hash of the previous record in the file. In this way, it is possible to go from the most recent entry back through all the entries by following the pointer.

In another embodiment, each log entry is a record in a database. This is quite useful to enable rapid search for a particular message hash, rolling hash, range of times, plain text, or whatever the rest of the content of the log entry contains. A database implementation is useful when large numbers of entries are being made in the log because databases provide transactional integrity.

Write Once Memory

In addition to the mathematical methods of insuring that events occur in sequence, in one embodiment, a physical tamper proof device is used to store a sequence of events. In one embodiment, the physical tamper proof device is a write once memory that stores the hashes of messages in order. Changing the entries in this sort of log would require changing the memory.

While write once memory is simple, it is hard to verify remotely that it hasn't been tampered with. Thus, in one embodiment, a tamper proof system provides digital signatures or other authentication techniques for its content.

Entangling

Because it is relatively easy to modify a single log, in one embodiment, information is exchanged between logs in such away that modification of the entries in one log can be detected by examining another log. It is important to store information in the second log that depends on all of the information in the first log. For the logs defined previously, the rolling checksum has that property. Each checksum depends on the previous checksum and the other data in the log entry. Thus, if any part of a log entry is changed, the rolling checksum changes, and the rolling checksums after that point also change. Regardless of the computation function used for the "hash," if the messages or records are longer than the hash, there exist multiple messages or records that have the same hash. However, if the function used for the rolling checksums are well chosen, e.g. a cryptographic hash function, it is extremely difficult to find these messages.

There are several ways to store information from one log in another log. This process is called entangling because after storing information from one log in another, all future rolling checksums in the second log depend on the information in the first log.

In one embodiment, the log being used is storing pairs of message hashes and rolling hashes, i.e. $(m_i, r_i)$, and the message hash for an entry in the second log is replaced by the rolling hash from the first log. Thus, all rolling hashes after that entry in the second log depend on the rolling hash from the first log.

While this is the simplest embodiment, the limited amount of information stored when entangling, can make it difficult to determine what the nature of the entanglement is. Thus, in one embodiment, additional information is included in the log entry used for entanglement. For example, those logs using a type value can set the type to indicate that the data is not a "regular message" but an "entanglement entry." Further, instead of using a rolling checksum directly in place of the message hash, a message can be formed which contains the rolling hash from the first log and the location of the first log (e.g., a server name, a log name, a file name, URL, etc.). In one embodiment, the location of the rolling hash in the first log is included (e.g. a sequence number, date, etc.). This embodiment allows a log to be followed backwards and allows determination of the other logs on which the current log depends.

Figure 3:
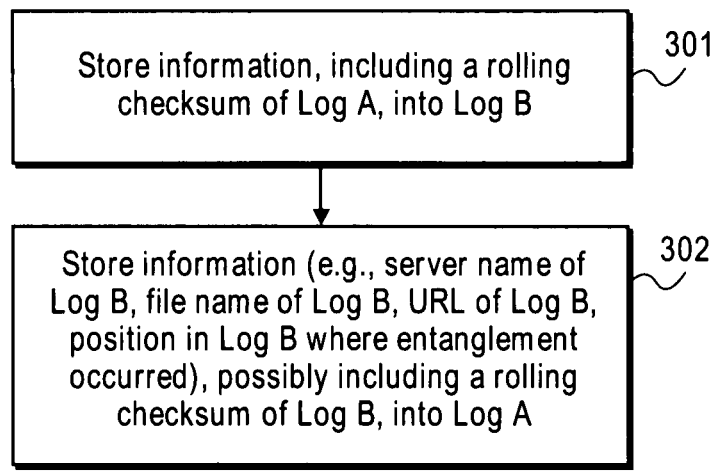
FIG. 3 is a flow diagram of one embodiment of a process for entangling a pair of logs.

In many case, it is desirable to determine which logs depend on a first log. In order to facilitate this, information can be stored in both logs when an entanglement is made. FIG. 3 is a flow diagram of one embodiment of a process for entangling a pair of logs. The process is performed by processing logic that may comprise hardware (circuitry, dedicated logic, etc.), software (such as is run on a general purpose computer system or a dedicated machine), or a combination of both.

Referring to FIG. 3, the process begins by processing logic storing information, including the current rolling checksum of log A into a log entry in log B (processing block 301).

Next, processing logic stores information about log B in log A (processing block 302). In one embodiment, the information stored in log A about log B may include the server name, file name, or URL of log B and the position in the log where the entanglement is stored. In one embodiment, the information stored in log A may also include a rolling checksum from log B. If this checksum is stored, the entanglement is both from log B to log A and from log A to log B.

Verification Procedure

In many situations, it is necessary to determine if a log has been modified since it was created. This is best done by software, computer systems, and people independent from the log generation hardware, software, and people.

Figure 8:
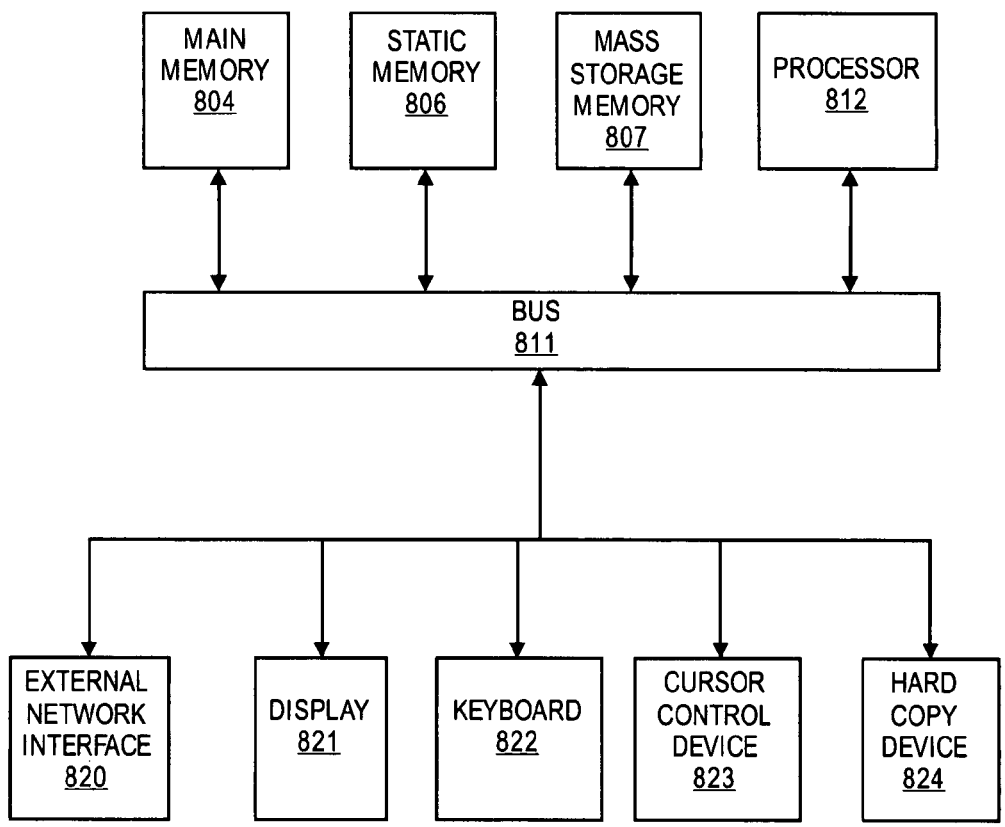
FIG. 8 is a block diagram of one embodiment of a computer system.

In one embodiment, to determine if a log is self consistent, verification software (such as in a computer system of FIG. 8 (or dedicated machine) recomputes the rolling hash for each entry in the log. If the rolling hash computed by the verification software matches the rolling hash stored in the log, then that entry has not been changed unless the hash function has been compromised. For purposes herein, the hash function "being compromised" means two distinct sequences of bytes have been found that yield the same hash.

To determine if entries in a log are consistent across multiple logs, the entries must be consistent from the message of interest up to and including a rolling checksum that is stored (entangled) in another log. The entries in the second log must be self consistent before and after the entanglement entry.

An Example of an Entangling Detection Procedure

Figure 4:
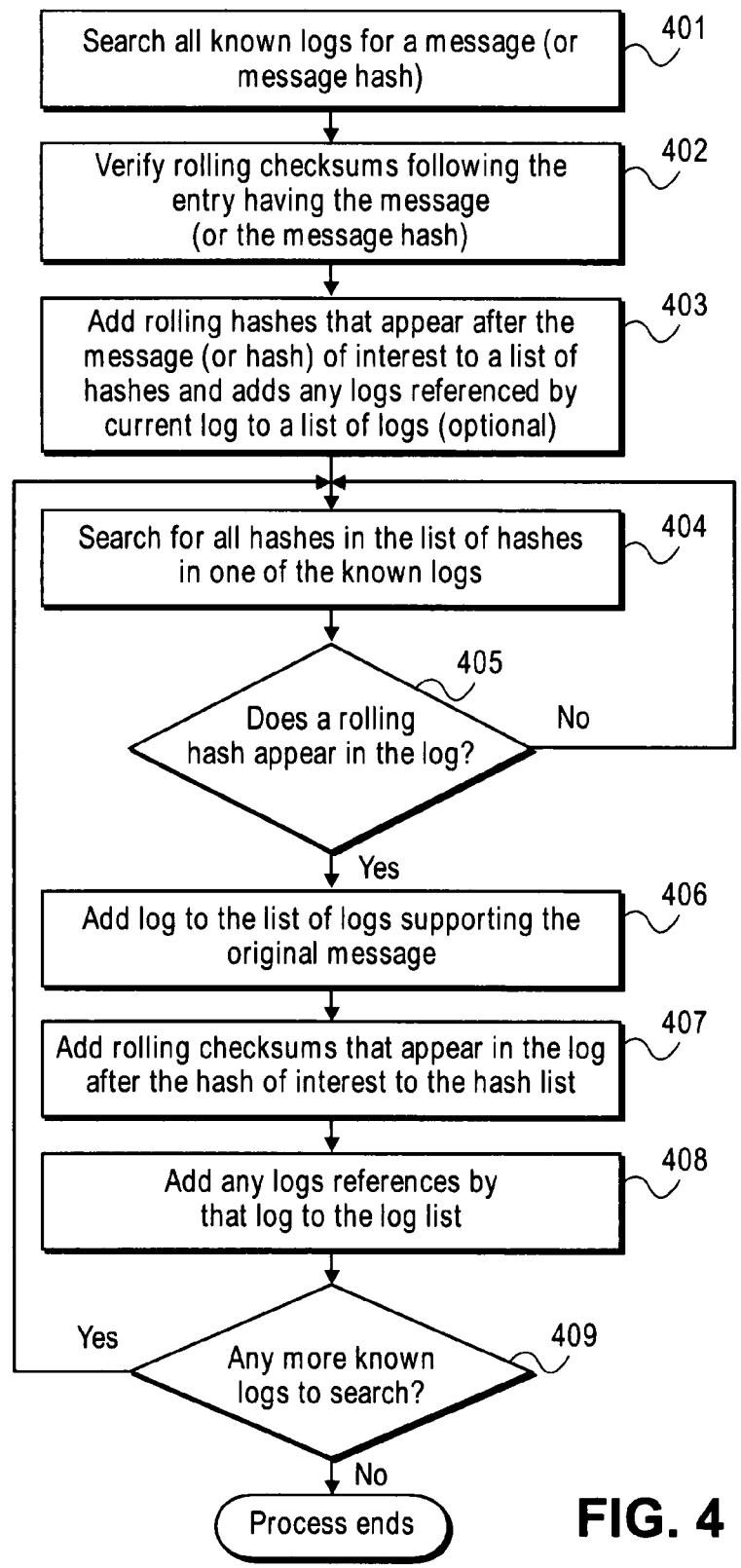
FIG. 4 is a flow diagram of one embodiment of a process for performing entanglement detection.

If a third party wishes to determine the validity of a message stored in a log some time after the entry was made and entangled with other logs, entanglement detection allows all servers which have entries that are consistent with the message to be determined. FIG. 4 is a flow diagram of one embodiment of a process for performing entanglement detection. The process is performed by processing logic that may comprise hardware (circuitry, dedicated logic, etc.), software (such as is run on a general purpose computer system or a dedicated machine), or a combination of both.

Referring to FIG. 4, the process begins by processing logic initializing a list of servers that have evidence to the empty set, initializing the list of messages or hashes of interest to the single message or hash desired and searching for the message or message hash of interest on all known logs (processing block 401). If the message or its hash is not found anywhere, no verification is possible and the process ends.

If a message or hash of interest is found, then the processing logic verifies the rolling checksums following the entry containing the message or hash, for every log where the message or message hash is found (processing block 402). In one embodiment, this is done by recomputing the checksums $r_i$ for the log using the verification software.

Processing logic adds all rolling hashes that appear after the hash of interest to a list of hashes, and adds any logs referenced by the current log to a list of logs of interest (processing block 403). Some logs will not list other logs, in which case there is nothing to perform for this sub-step.

Processing logic searches for all hashes in the hashes of interest list in one of the known logs that hasn't been searched (processing block 404). Afterwards, processing logic tests whether a rolling hash appears in the log (processing block 405). If not, the process transitions to processing block 404 where the process continues. If a rolling hash appears in a log, processing logic adds that log to the list of logs with evidence about the original message or hash (processing block 406), and adds all rolling checksums that appear in the log after the hash of interest to the hash list (processing block 407) and adds any logs referenced by that log the log list (processing block 408).

Processing logic then checks whether there are any more known logs to search (processing block 409). If not, the process ends. If so, processing transitions to processing block 404 and repeats the process until no new hashes are added to the list of hashes of interest, and no new logs are added to the list logs.

In general, many logs may be stored on the same device, same office, or same company. However, if a log is entangled with logs on multiple physical devices, or with logs which are under the control of different companies, then someone verifying the logs will have more confidence that the log has not changed. This benefit of entangling with different devices means that the logs should be able to store addresses of entangled logs that cross company and device boundaries. One way to do this is to use a URL to identify a log.

The python source code below determines logs that confirm the message hash in another log. This source code is designed to work for a particular form of log that doesn't contain references to other logs. Thus, it only finds evidence in the logs it initialized to check and new hashes are searched for only in the known logs. The source code is designed to access logs from multiple independent http servers. The source implementation currently uses only one log per sever, but the URLs could be modified to allow multiple logs per server.

The following sample software may be used to determine valid entanglements:

```
'''
Program to examine a set of servers for a given hash or file, then look for
the hash chains leading from that document to other servers.
'''
import sys
from Crypto.Hash import SHA256
import urllib
from optparse import OptionParser
parser = OptionParser( )
parser.add_option("-f", "--file", dest="filename",
                  help="Find servers who know about file",
                  metavar="FILE")
parser.add_option("--hash", dest="hash",
                  help="Find servers who know about hash")
parser.add_option("-q", "--quiet",
                  action="store_false", dest="verbose", default=True,
                  help="don't print status messages to stdout")
(options, args) = parser.parse_args( )
hashlist = [ ]
if options.hash:
    hashlist.append(options.hash)
if options.filename:
    try:
        f = open(options.filename, "rb")
        hf = SHA256.new( )
        blocksize = 32*1024
        while True:
            data = f.read(blocksize)
            hf.update(data)
            if len(data) < blocksize:
                break
        hashlist.append(hf.hexdigest( ))
    except IOError:
        print "Could not process file: %s" % options.filename
if len(hashlist) == 0:
    print "No hash or file supplied"
```

```
    parser.print_help( )
    sys.exit( )
unconnectedserverlist = ['http://localhost:9001/',
                        'http://localhost:9002/',
                        'http://localhost:9003/',
                        'http://localhost:9004/',
                        'http://localhost:9005/']
serverstatus = { } # what is the condition observed on each server
#List of servers that have a chain to the document in question
foundlist = [ ]
#Evidence for each rolling hash
#Dictionary with rolling hash: key is hash, value is log entry that hashes to
that key evidencelist = { }
while( len(hashlist)> 0 and len(unconnectedserverlist) >0):
    #For the next hash, search the unconnected servers
    searchhash = hashlist.pop(0)
    for server in unconnectedserverlist:
        devicelog = SHA256.new(server).hexdigest( )
        url = server + 'log?logUID=%s&messagehash=%s' %
        (devicelog,searchhash)
        try:
            if options.verbose:
                print "Trying url: " + url
            result = urllib.urlopen(url)
            #want a sequence number so I can get stuff after this, or a way to
ask for all checksums after the found event
        except IOError:
            continue
        line = result.readline( ) # we only check the first line which should
be lowest sequence number
        if (line.find('No Entries') >= 0): #Depends on way empty results
            are returned continue
        #split into (type,message,rchecksum)
        (seq,type,message,rchecksum) = line.split(':')
        if (searchhash != message):
            print "Error Server %s returned a match for %s that didn't match.
Returned value: %s message %s len1 = %d len2 = %d" %
(server, searchhash, line,message,len(searchhash),len(message))
        else:
            if options.verbose:
                print "Adding found server: " + server
            foundlist.append((server,seq,message)) # Yea! # in the end we
may want the whole chain!
            serverstatus[server] = "Found Document or Hash Chain to
Document"
            unconnectedserverlist.remove(server)
            # we want to get a previous hash for confirmation
            if int(seq) >0:
                seq = str(int(seq) −1 )
            else:
                print "Warning we will miss an item!"
            url2 = server + 'log?sequence=%s-&logUID=%s' %
            (seq, devicelog)
            try:
                if options.verbose:
                    print "Trying url: " + url2
                result2 = urllib.urlopen(url2)
            except IOError:
                continue
            #Add all rolling hashes from the message entanglement on to the
hash list (if they verify)
            data = result2.readlines( )
            line2 = data[0]
            data = data[1:]
            (seq2,type2,message2,rchecksum2) = line2.split(':')
            prevchecksum = rchecksum2[0:64]
            for line2 in data:
                (seq2,type2,message2,rchecksum2) = line2.split(':')
                rchecksum2 = rchecksum2[0:64] # drop new line
                # test rchecksum2
                testentry = prevchecksum + '\n'+ type2 + ':' + message2 + ':'
                confirmchecksum = SHA256.new(testentry).hexdigest( )
                if confirmchecksum != rchecksum2:
                    print "Failed to confirm checksum on server %s, seq %s"
                    % (server, seq2)
                    print testentry,len(testentry),confirmchecksum,rchecksum2
                    serverstatus[server] = 'ERROR IN HASH CHAIN'
                    break #do not add any checksums past the bad data
                evidencelist[rchecksum2] = testentry
                prevchecksum = rchecksum2
                if options.verbose:
                    print "Adding hash to search for: " + rchecksum2
                hashlist.append(rchecksum2)
if options.verbose:
    print "\n\nFound a Log Chain to the following servers:"
    print foundlist
    print "\nEvidence"
    print evidencelist
print "\n\nServer reports for given hash"
for i in serverstatus.keys( ):
    print i, serverstatus[i]
```

In general, the technique described above to verify logs can involve a lot of operations. However, the complexity can be reduced by keeping better track of hashes and logs that have been previously searched. Complexity can also be reduced by only considering log entries occurring before a certain time, or searching certain logs first, for example if it is known that certain logs are used for entangling more often these can be searched earlier.

Authentication via Logs

The rolling checksum in a log can be used as part of an authentication mechanism. For example, knowledge of the most recent rolling checksum $r_N$ could be used as permission to write an additional entry to a log. A device keeping a log could insist that the most recent checksum be provided with the new log entry. By doing so, if two other devices know the current checksum, and both request to write to the log, only one will succeed. The first device to provide a new log entry will cause the checksum to change, and then the second device will not have the correct checksum. This technique provides a way to insure that new data is added to the log only if the provider of the data has the most up-to-date information about the log. Thus, the checksum can be used to as a form of "lock" on the log to prevent race conditions.

The above discusses using the rolling checksum to control access to the log, but the rolling checksum can also be used to prove that the same log is being used again. In this case, the full contents of the log should not be publicly available. Someone could make a first interaction with a system using a log, and store a message in that log, and provide the rolling hash to the system (e.g., perhaps a message is stored when a deposit is made to an account). Subsequently, when it is desired to make a withdrawal from the account, the system could ask for the rolling hash used to make the deposit. If more security is desired, in one embodiment, the system asks for information about that rolling hash (e.g., the hash of that rolling hash and a challenge string). The system could ask for several pieces of information about a previous interaction, that could only be answered by someone in possession of the log.

Authentication Via Logs

The rolling checksum in a log can be used as part of an authentication mechanism. For example, knowledge of the most recent rolling checksum r_N could be used as permission to write an additional entry to a log. A device keeping a log could insist that the most recent checksum be provided with the new log entry. By doing so, if two other devices known the current checksum, and both request to write to the log, only one will succeed. The first device to provide a new log entry will cause the checksum to change, and then the second device will not have the correct checksum. This technique provides a way to insure that new data is added to the log only if the provider of the data has the most up-to-date information about the log. Thus, the checksum can be used to as a form of "lock" on the log to prevent race conditions.

The above discusses using the rolling checksum to control access to the log, but the rolling checksum can also be used to prove that the same log is being used again. In this case, the full contents of the log should not be publicly available. Someone could make a first interaction with a system using a log, and store a message in that log, and provide the rolling hash to the system (e.g., perhaps a message is stored when a deposit is made to an account). Subsequently, when it is desired to make a withdrawal from the account, the system could ask for the rolling hash used to make the deposit. If more security is desired, in one embodiment, the system asks for information about that rolling hash (e.g., the hash of that rolling hash and a challenge string). The system could ask for several pieces of information about a previous interaction, that could only be answered by someone in possession of the log.

Overview of Sarbanes-Oxley

Figure 5:
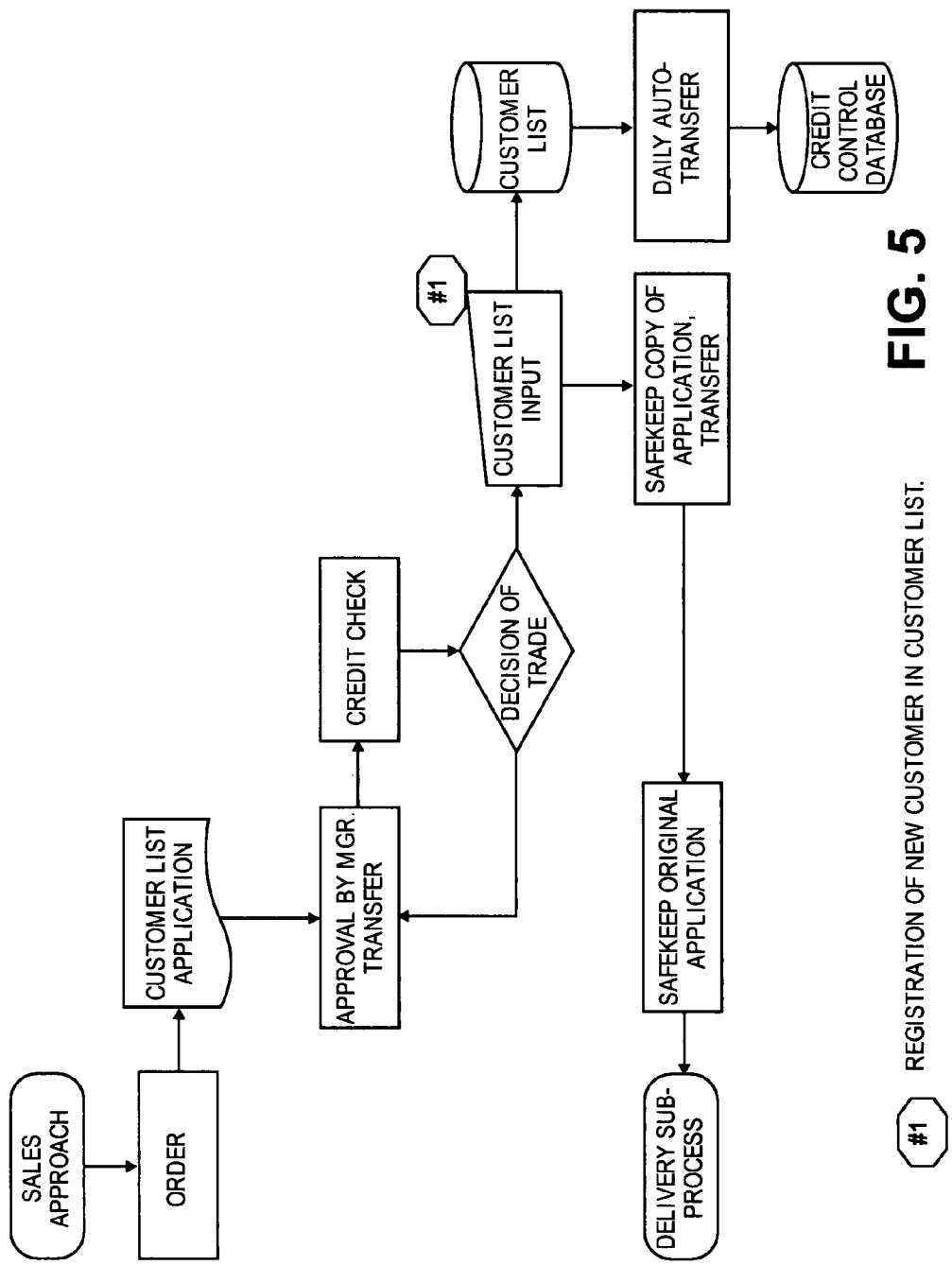
FIG. 5 is an example of a workflow type for the "Sales Credit Control".

Sarbanes-Oxley compliance can be roughly summarized as requiring the following four steps: 1) document business work processes; 2) identify risks; 3) implement control points to limit risk; and 4) audit the implementation. For purposes herein, all work processes are defined as a flow chart or flow diagram and each business process with a different flow chart is referred to as a different "workflow type." For example, there could be workflows for each different business operation, such as, for example, Purchasing, Month End Close, and Travel Requests. A sample workflow type for the "Sales Credit Control" is shown in FIG. 5.

In one embodiment, each workflow may be used multiple times. For example, the "Month End Close" workflow is used twelve times per year. A "Purchasing" flow might be used hundreds of times per month, and at any given time different instances of the workflow are in different states (e.g., waiting for approval, waiting for delivery, waiting for the check to be cut, etc.).

In one embodiment, each workflow has a set of one or more control points. These control points are the items that will be checked in the audit. The control points for the "Sales Credit Control" are shown as crosshatched dots on the flowchart in FIG. 5. Each control point has some document image associated with it that verifies the control was implemented. The type of this document image depends on the workflow type and the step in the workflow. In the case of a purchasing workflow, the document type could be one of: Request, Quote, PO, Packing-list, Invoice, or Check. For a month end close, the types might be entries in the general ledger, or even an email from the CFO saying the month end process is complete.

In one embodiment, the documentation required to audit the implementation is thus described by a triple consisting of (the workflow type, the workflow instance, and the control point). Note that because of loops in the workflow, there may be more than one document associated with a particular (workflow, instance, and control point) triple.

The following disclosure describes a set of interactions and devices that make use of this understanding of business processes to aid in auditing. In one embodiment, a "SOX server" provides monitoring that may be useful for any governmental regulation or internal business policy that can be monitored by tracking "document images."

User Interaction

In one embodiment, there are two primary user interactions with the SOX server: adding tagged document images and accessing document images and tags e.g. to verify compliance with some regulation. In verification, it is possible to obtain additional information about the "trustworthiness" of a particular document, i.e. evidence that a document was not changed, and/or was processed by the appropriate person.

In one embodiment, in addition to the main user interactions, there is a configuration operation in which the workflows and the types of documents in the workflow are defined.

Image and Metadata Capture from Many Sources

In one embodiment, the SOX server receives image and metadata from a variety of sources. For purposes herein, an electronic source is no different from a paper source. Documents can be scanned, electronic files can be rendered to bitmaps, and files can be accepted directly from a computer via shared disks, email, ftp, http, etc.

Using today's network protocols on modern devices, a document can be scanned and the electronic bitmap sent directly to a disk or via email. In one embodiment, these connections are made secure. Furthermore, the receipt of the proper bitmap can be verified. For example, a multi-function peripheral (MFP) may create a cryptographic hash of the bitmap and save it. The server creates a hash and sends it back as a receipt, and the MFP can compare and log both hashes.

In one embodiment, control of the image entry, the entry of the work process, a check point, and instance, and entry of any other metadata for association with the image are achieved with one or more traditional interfaces. For example, data could be entered on the front panel of the machine, or a control or job sheet could be scanned together with the document, or watermarks or barcodes on the source document can be used to control the process.

With respect to printed documents, at print time, most computer application programs send specific instructions on how a document image should be rendered to a bitmap to the printer driver. In one embodiment, the printer driver renders these instructions to a human viewable image. In one embodiment, this system presents the image to the human user and provides an interactive computer interface to gather the work process, check point, and instance, and necessary metadata. In one embodiment, similar security and verification to the scanned method is also provided.

In one embodiment, document and/or document image can be entered into the system via an HTTP server and a web browser. In one embodiment, the SOX server serves a website that would control the data entry and metadata collection. This can also be a secure and verified transaction.

The document image can be sent in the body of an email or as an attachment. In one embodiment, the control and metadata are sent in a structured way using the subject, body, and other fields of an email. If the server does not receive the correct data, a return email is sent asking for more information. The user could respond with a properly formatted email, respond to a number of links on the return email, respond to a number of email addresses, launch an HTTP interaction, or some other response. This interaction can be secure and verified if the correct email client and/or configuration is used.

In one embodiment, this interaction is much the same as the other computer entry method except that there is often no interface with these protocols that allows the attachment of metadata. In one embodiment, this is overcome by using special directories in a hierarchy to control and add metadata. Alternatively, files containing the metadata are associated with some rule-based naming system. In yet another embodiment, there is a special application program with the interface for that data.

Access to Prove Compliance

In Sarbanes-Oxley regulations, for each workflow, a number of random test instances is chosen based on the frequency of usage of the workflow. For example, a purchasing workflow that is used 500 times per month must be tested many times, while a "Month End Close" used only 12 times a year must be tested only a few times.

In all cases, the "verification" is based on an instance of the workflow and a determination of whether the controls were implemented for that instance of the workflow. In the SOX server, there is a visual record of each control point.

Figure 6:
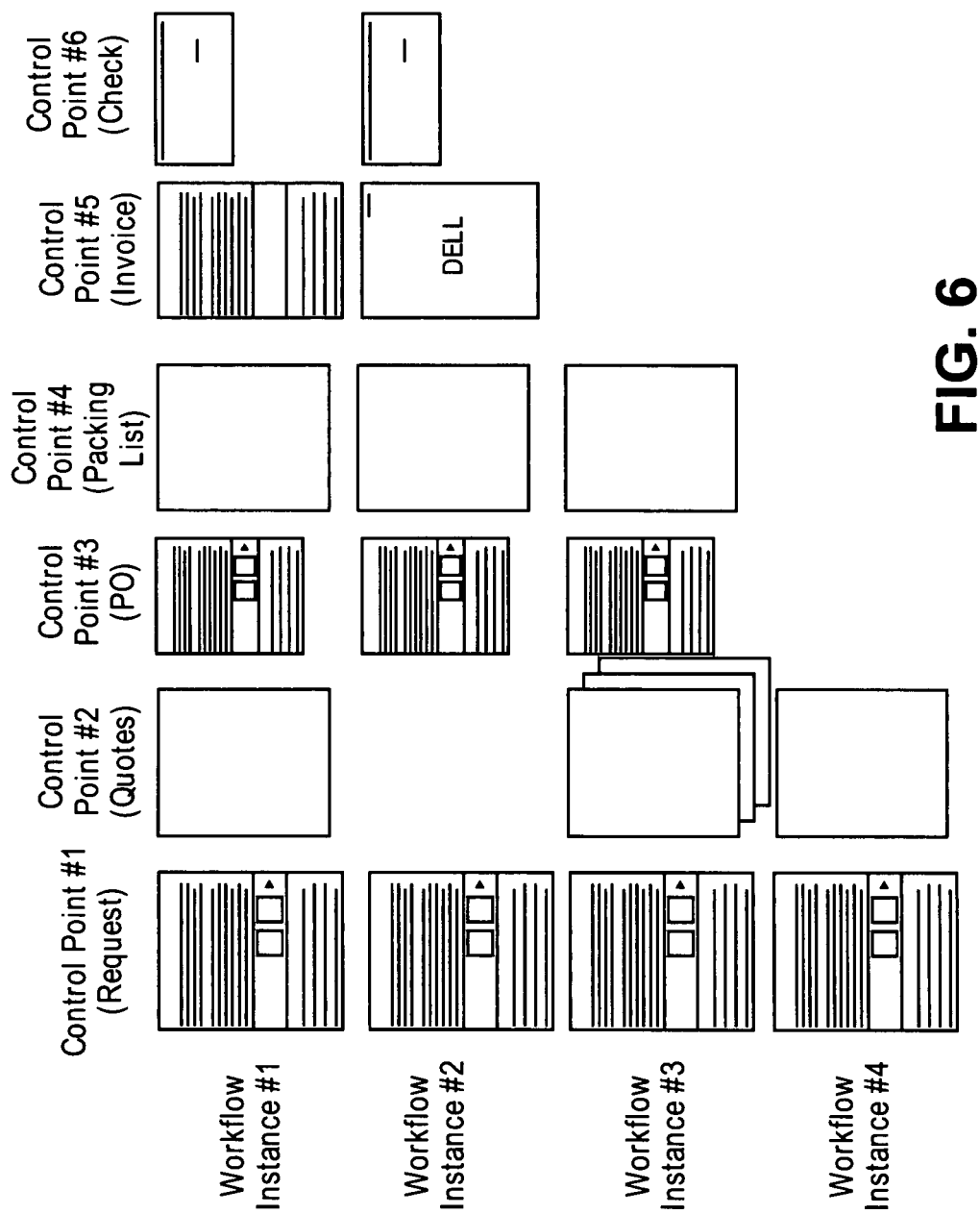
FIG. 6 illustrates sample documents for a purchasing workflow.

FIG. 6 illustrates sample documents for a purchasing workflow. Referring to FIG. 6, there are 6 control points corresponding to a request document, a quote, a purchase order, a packing list, an invoice, and a check. For a different workflow, there would be different names for the controls points, and a different number of control points, but there would still be some visual representation of each control point. Vertically in the FIG. 6, there are different workflow instances, each corresponding to different purchase requests.

Note that a single request might yield multiple quotes, multiple purchase orders, multiple invoices and multiple checks. For particular control points in some workflow instances, there might not be a document. As shown in FIG. 6, the second workflow instance is missing a quote. Depending on the particular business policy, that omission could trigger a larger audit. In other cases, it may be acceptable to be missing a document (e.g., some requests for "standard" items do not require quotes). In some workflows, there may be multiple branches, and a control point might only be used if a particular branch is used, e.g. purchases over $5000 require additional approvals.

In one embodiment, the SOX server does not provide any semantic checking of the documents provided for the control points. It is possible to enter a blank page as the "Invoice" for a particular workflow. Thus, complete verification involves human examination of the control point images. However, such verification can be assisted by the server and metadata indicating that a semantic check was done and who did it can be recorded by the system, and later authenticated just as for the document images.

Document Authenticity

In one embodiment, the server does not provide any help with the semantic understanding of the document content. However, it provides evidence from external sources to help in verifying the document. For any document, the time of initial storage and the metadata associated with storage can be provided. This can include information from the workflow triple, but it can also include information like a user name, or department, etc. In one embodiment, the server is configured to exchange "cryptographic checksums" (e.g., hash values) with other devices (e.g., servers, other logging devices, which could include servers). This exchange allows proof that the document was in existence by a particular time and that it has not been modified since that time.

The information available to authenticate a document includes any metadata entered when the document was logged. This could include a digital signature done by a smartcard from the scanner or a PIN from the printer driver. The timing data available can be more complex. In one embodiment, the timing data is a timestamp from the SOX server. Such a timestamp might have been changed by someone with access to the machine. Thus, it is possible to follow the chain to other servers and retrieve their timestamp for the chain. By using a hash chain, it is possible to authenticate any log entry as occurring before a timestamp on the second server. For example, the local server might assert that a document was entered at 9:57 AM on Thursday Sep. 28, 2006 (PST). A server that had an entangled log somewhat later could only confirm that the document existed before 10:03 AM, and a server that entangled with that server only once per day might only be able to confirm that the document existed before 5:00 PM. Assuming servers entangle at least once a day, the confidence in the date of any particular document will be absolute.

In one embodiment, the local SOX server provides the information about the document authenticity. Alternatively, a trusted application on a verification device e.g., an auditor's computer is used to query the witnessing servers, and verify that they contain the entries claimed by the local SOX server.

SOX Server Implementation

Figure 7:
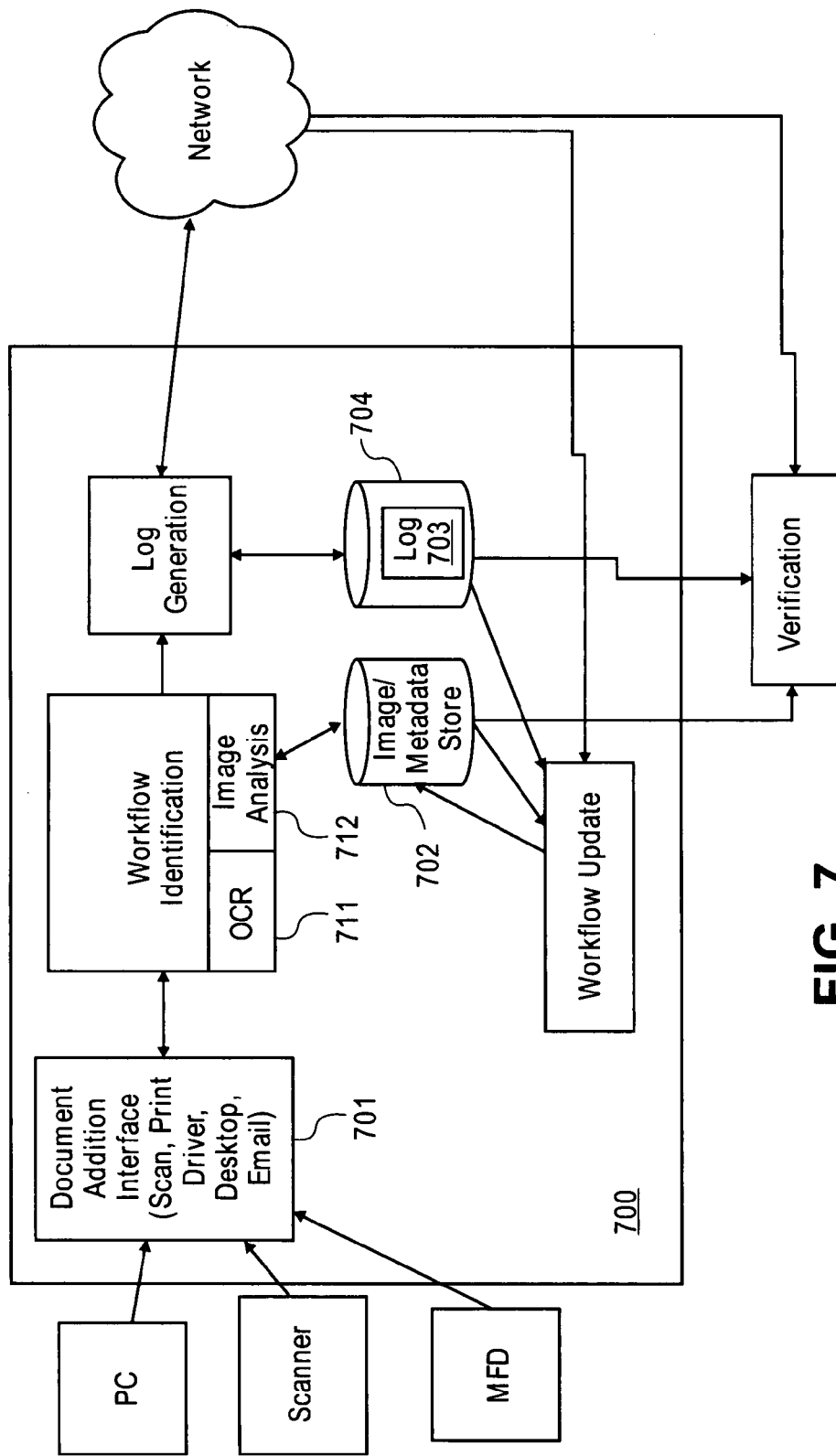
FIG. 7 illustrates a block diagram of one embodiment of a SOX server and associated systems.

FIG. 7 illustrates a block diagram of one embodiment of a SOX server and associated systems. Each block represents processing logic that may comprise hardware (circuitry, dedicated logic, etc.), software (such as is run on a general purpose computer system or a dedicated machine), or a combination of both.

Referring to FIG. 7, the SOX server 700 itself is the large central unit. Documents are acquired from personal computers (PCs), scanners, multifunction devices. Document receiving interface 701 tags the collected document with the workflow type, workflow instance, and control point. Documents and metadata are saved in the image and metadata store 702, they are also logged (e.g., a hash is generated) and saved in the log 703, which is in memory 704.

Workflow identifier 710 identifies the workflow associated with documents received by document receiving interface 701. In one embodiment, the user providing the document indicate the workflow, type, control point, and even workflow instance. However, the user can be assisted by SOX server 700, for example if image analysis could determine the document type, and use that information to reduce the number of choices about workflows and instances to present to the user. In one embodiment, workflow identifier 710 includes an optical character recognition (OCR) module 711 to perform optical character recognition and an image analysis module 712 to perform image analysis on documents received by document receiving interface 701, both functions may be used to associate a particular document with a workflow, workflow instance, or control point, thus reducing the need for a user to provide this information.

Log generator 705 interacts with other servers to exchange checksum information. The workflow update item may acquire information from other servers about document or status and use that to update the image store and the collection of workflow instances.

In one embodiment, the verification module 706 is independent of the SOX server, because the verification process needs to be able to detect if the SOX server is compromised. The verification module 706 accesses information from the SOX server and other servers with which the SOX server has entangled. If data has been changed on the local SOX server, then either the local log will be inconsistent, or the copies of entries in other servers will not match.

Document Logging

In one embodiment, as each image is added to the SOX server, the SOX server adds the hash value for the document to a log and computes a rolling checksum that is stored in the log as well. The workflow tags and other metadata and checksums from other servers are stored in the log as well. In one embodiment, the SOX server stores a "log entry type" a "Message hash" and a "rolling hash" or checksum in the log, where the message hashes and rolling hashes are twenty bytes if SHA-1 is used and 32 bytes if SHA-256 is used. Thus, in one embodiment, the information contained in the log is organized like the Table #1 below. Note that rather than items like "#1", a 20 bytes binary value or 40 byte hexadecimal value is stored.

TABLE 1

Sample Information Stored in Log

| 1.1 Information Type | 1.2 Hash of Message Content | 1.3 Rolling Hash |
| --- | --- | --- |
| Document | #1 | #1 |
| Document Capture Data | #2 | #2 |
| Document Workflow Data | #3 | #3 |
| Entanglement Info | #4 | #4 |
| Document | #5 | #5 |
| Document Capture Data | #6 | #6 |
| Document Workflow Data | #7 | #7 |
| Document | #8 | #8 |
| Document Capture Data | #9 | #9 |

In one embodiment, the type information is stored in the log. In an alternative embodiment, the type information is determined from the message content. An advantage of storing the type information directly in the log is that it allows the log to be used as an index to some of the content. In particular, when determining the authenticity of a known document, the "Document" entries are searched until the matching hash is found, then the log can be scanned until the next entry labeled "Entanglement Info" is found. This entry provides the earliest external server that may be used to establish a bound on the existence of the document in question.

Information Stored in the Image/Metadata Store

Below, Table 2 illustrates an example of information stored in the image/metadata store in one embodiment of the SOX server. These entries correspond to the data in Table #1, and could be located by using the hash values.

TABLE 2

Information Stored in Image/Metadata store

| 1.4 Hash | 1.5 Message Content |
| --- | --- |
| #1 | Scanned Image (e.g. tiff, JPEG) |
| #2 | Scanner ID, settings, user info |
| #3 | Workflow Type, Document Type, Workflow Instance |
| #4 | Server location, Remote Hash #, Local Hash # |
| #5 | Printed Image (e.g. Postscript, PDF) |
| #6 | PC ID, settings, user info |
| #7 | Workflow Type, Document Type, Workflow Instance |
| #8 | Web Document (e.g. HTML) |
| #9 | RSS Feed, URL of source |
| #10 | Workflow Type, Document Type, Workflow Instance |

In the above tables, the "document" is the visual record required for a control point. It might be a scanned image, e.g. a tiff or jpg, it might be an electronic image, e.g. postscript or pdf or ascii email. The "capture data" refers to information associated with the document. This could include the device it was printed on, scanned from, or emailed from, or it could include a digital signature for the document captured by a device. The SOX server provides this information as an output to the verification device.

In one embodiment, the "Workflow Data" is the metadata triplet (workflow type, workflow instance, control point).

The "Entangling Information" indicates from where the log may be audited. In one embodiment, this includes a URL of another logging server, the index and value of the hash of the local server that is verified by the remote server, and the index and hash in that server that verify the entry. While this information is not strictly needed, it vastly increases speed at which verification can be done.

Entanglement Protocol

The SOX server exchanges rolling hashes with other logging devices as described above. Verification is performed by finding several other servers to authenticate the log for a particular server.

In one embodiment, the SOX server is configured to exchange hashes with specific servers, some of which are outside of the control of the company that is employing the SOX server for regulatory compliance. The log checksums may be exchanged with servers in companies that already have a business relationship with the company. It is advantageous that these servers will be easy to find when it is time to do a verification, and there is a high likelihood that these servers will be around if verification is desired years later, because of the nature of their businesses.

In one embodiment, the SOX server is also able to actively acquire data. For example, some control point may be already stored, e.g. on a company Wiki or Blog. In one embodiment, the SOX server is able to use an RSS or ATOM feed to determine if new information has been posted, access this information, and log a visual record. For example, the SOX server may request an RSS feed for a blog, and then access all blog entries made in the last 24 hours. These entries could be rendered to a visual representation and stored on the SOX server. If the blog or wiki is sufficiently structured, the information about workflow instance, and control point may be determined without additional user interaction, e.g., tags on the blog could indicate a document type like an invoice, or a workflow, like purchasing, and content could be sufficient to match the workflow instances (e.g., by using an invoice number).

Annotating Document Inputs

Various methods of acquiring data may be used to obtain the triple (workflow type, workflow instance, and control point). In one embodiment, any document can be added to any workflow instance and control point (even if there is already a document for that control point). Indeed, this functionality should be accessible at some level to provide corrections to previously provided documents. In one embodiment, this would not replace the original but be available in addition to the previous data.

In one embodiment, given a workflow type, the SOX server provides a list of open workflow instances and also offers to start a new workflow. A user can associate the document with a current instance or start a new one. If the SOX server knows the document type (e.g., a packing list), then some workflow instances can are not appropriate (i.e., those that already have a packing list and those that don't have a purchase order). Likewise, if the SOX server knows the workflow instance, then there is often a obvious next document type. In one embodiment, for the case of correct previous entries, these user assists may be overridden.

In some cases, an image is available (from scanner or print driver). In these cases, image analysis can be done to classify the document, and perhaps determine some content. For example, if a document is recognized as a "Dell Invoice," then workflows where a PO was issued to Dell can be ranked more highly. If an invoice # can be recognized, it may be possible to determine the metadata triple automatically. Perhaps the user would only confirm that this document should be added to the workflow where a computer was requested and Dell was chosen as the vendor.

An Example of a Verification Method

In one embodiment, to verify a workflow, the verification software starts with information stored in the SOX server database about the workflow state and the hashes of each item in the workflow. These items can be accessed from the SOX server image store and displayed for example as a row of FIG. 6. In one embodiment, the verification software declares that a workflow was incomplete because the required document types are not all present. In one embodiment, the verification software does not understand the content, so the user of the verification software must check that an invoice from dell is not a blank piece of paper for example.

For any document, the verification software can go from the location of the documents hash in the log file to the next entry that contains "entangling information." The software can then access the "certificate" from the metadata store, access the server listed as providing verification, and determine if indeed the SOX server's checksum appears in that server's log. If all of these checksums match, then the verification software can indicate that the document existed by a particular date, based on a particular external server's clock.

An Example of a Computer System

FIG. 8 is a block diagram of one embodiment of a computer system that may perform one or more of the operations described herein. Referring to FIG. 8, computer system 800 may comprise an exemplary client or a server computer system. Computer system 800 comprises a communication mechanism or bus 811 for communicating information, and a processor 812 coupled with bus 811 for processing information. Processor 812 includes a microprocessor, but is not limited to a microprocessor, such as, for example, Pentium™, etc.

System 800 further comprises a random access memory (RAM), or other dynamic storage device 104 (referred to as main memory) coupled to bus 811 for storing information and instructions to be executed by processor 812. Main memory 804 also may be used for storing temporary variables or other intermediate information during execution of instructions by processor 812.

Computer system 800 also comprises a read only memory (ROM) and/or other static storage device 806 coupled to bus 811 for storing static information and instructions for processor 812, and a data storage device 807, such as a magnetic disk or optical disk and its corresponding disk drive. Data storage device 807 is coupled to bus 811 for storing information and instructions.

Computer system 800 may further be coupled to a display device 821, such as a cathode ray tube (CRT) or liquid crystal display (LCD), coupled to bus 811 for displaying information to a computer user. An alphanumeric input device 822, including alphanumeric and other keys, may also be coupled to bus 811 for communicating information and command selections to processor 812. An additional user input device is cursor control 823, such as a mouse, trackball, trackpad, stylus, or cursor direction keys, coupled to bus 811 for communicating direction information and command selections to processor 812, and for controlling cursor movement on display 821.

Another device that may be coupled to bus 811 is hard copy device 824, which may be used for printing instructions, data, or other information on a medium such as paper, film, or similar types of media. Furthermore, a sound recording and playback device, such as a speaker and/or microphone may optionally be coupled to bus 811 for audio interfacing with computer system 800. Another device that may be coupled to bus 811 is a wired/wireless communication capability 825 to communication to a phone or handheld palm device.

Note that any or all of the components of system 800 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A server system comprising:

a first memory;

a second memory; and a processor coupled with the first memory and the second memory that captures images of documents associated with one or more workflows and tag the collected document images with workflow information indicative of an associated workflow, wherein for each tagged document image, the workflow information comprises a metadata triplet that includes a workflow type, a workflow instance, and a control point, wherein the workflow type differentiates between different workflow processes, each of the different workflow processes comprising a control point execution sequence associated with a corresponding workflow process, the workflow instance differentiates between different instances of the same workflow type, and the control point indicates a stage in an instance of a workflow process for which the tagged document serves as a visual record of execution of the control point, stores the captured images of documents and metadata in the first memory, the first memory being accessible for verification operations performed with respect to the workflow, stores a log that includes entries with one or more media identifiers corresponding to the captured images in the second memory, the second memory being accessible for verification operations performed with respect to the workflow, generates log data corresponding to the images associated with workflows captured at the document receiving interface and store the log data in the log, and provides information about the log to another application, store entanglement information into the log, and use the entanglement information to verify compliance with a regulation for execution of a workflow during a selected time period comprising, further compromising the processor selecting a set of instances of the workflow, wherein each instance in the set is randomly selected from among all instances of the workflow created during the selected time period, instances selected for the set being based on a total number of instances created during the selected time period, for each instance of the work flow in the set of instances, auditing a control point execution sequence in said each instance of the workflow by determining that one or more entries corresponding to document images associated with control points in the workflow existed in the log at specific times corresponding to an order of the sequence of control points, wherein an existing entry in the log is verified to have existed at the specific time by utilizing entanglement information in the log stored after the entry in the log, the entanglement information indicative of a peer server that supplies a clock value when hash values are verified, a first index and a first hash value from the log that are verifiable by the peer server, and a second index and a second hash value stored by the peer server that verify the existing entry, and verifying compliant execution of the workflow during the selected time period based on a determination that the control point execution sequence for all instances of the workflow in the selected set of instances has been successfully audited.

2. The server system defined in claim 1, further comprising the processor logging data by generating a media identifier for each captured document and storing each media identifier in the log.

3. The server defined in claim 2 wherein the media identifier comprises a hash value generated by applying a hashing function to said each captured document.

4. The server defined in claim 3, further comprising the processor adding the hash value to the log with a rolling checksum.

5. The server defined in claim 4, further comprising the processor adding workflow tags and checksums from other servers into the log.

6. The server defined in claim 1 wherein the log stores entries that comprise a log entry type, a message hash, and a rolling hash.

7. The server defined in claim 6 wherein the log entry type is determined from content of the captured image.

8. The server defined in claim 1, further comprising the processor exchanging cryptographic checksum information with the peer server.

9. The server defined in claim 1, further comprising the processor capturing information associated with the document being captured.

10. The server defined in claim 1 wherein each workflow includes a plurality of control points, where each control point is associated with at least one visual record.

11. The server defined in claim 1, further comprising the processor generating a time of initial storage and one or more data associated with images that are associate with a control point.

12. The server defined in claim 1, further comprising the processor supporting interactions by adding tagged media images to the log and the image store and provides access to media to verify compliance of the regulation.

13. The server defined in claim 1 wherein the first memory and the second memory are on the same device.

14. The server defined in claim 1 wherein the second memory stores authentication information associated with one or more documents stored in the first memory.

15. The server defined in claim 1 wherein the first memory stores authentication information.

16. The server defined in claim 1 wherein the first memory stores a certificate validating a first document.

17. The server defined in claim 1 wherein each of the plurality of workflows represents a business process, and further wherein each of the plurality of workflows has a plurality of control points, wherein the control points are items examined in an audit and each control point has one or more documents with it to verify that the control was implemented based at least in part on the utilization of the entanglement information to verify the one or more documents existed at the specific time.

18. The server system defined in claim 1, further comprising the processor exchanging information with at least one other device to receive the entanglement information.

19. A method comprising:

receiving images of documents associated with control points of one or more workflows, wherein each of the plurality of workflows represents a business process, and further wherein each of the plurality of workflows has a plurality of control points, wherein the control points are a sequence of items examined in an audit and each control point has one or more documents associated with it that serve as a visual record that verify that the control point was implemented;

tagging the collected document images with workflow information indicative of an associated workflow, wherein for each tagged document image, the workflow information comprises a metadata triplet that includes a workflow type, a workflow instance, and a control point, wherein the workflow type differentiates between different workflow processes, each of the different workflow processes comprising a control point execution sequence in a workflow process, the workflow instance differentiates between different instances of the same workflow type, and the control point indicates a stage in an instance of a workflow process for which the tagged document serves as a visual record of execution of the control point;

storing received images of documents with metadata in a memory accessible for verification operations performed with respect to the workflow;

storing a log that includes, generating log information in a log, the log information corresponding to the received images associated with workflows, the log including entries with one or more media identifiers corresponding to the received images; and interacting with one or more other devices to provide log information, wherein interacting with one or more devices to exchange log information comprises entangling the log with a log of each of the one or more other devices, wherein the entangling allows verification of compliance with a regulation for execution of a workflow during a selected time period comprising selecting a set of instances of the workflow, wherein each instance in the set is randomly selected from among all instances of the workflow created during the selected time period, instances selected for the set being based on a total number of instances created during the selected time period, for each instance of the work flow in the set of instances, auditing the control point execution sequence in said each instance of the workflow by determining that one or more entries corresponding to document images associated with control points in the workflow existed in the log at specific times corresponding to an order of the sequence of control points, wherein an existing entry in the log is verified to have existed at the specific time by utilizing entanglement information in the log stored after the entry in the log, the entanglement information indicative of a peer server that supplies a clock value when hash values are verified, a first index and a first hash value from the log that are verifiable by the peer server, and a second index and a second hash value stored by the peer server that verify the existing entry, and verifying the compliant execution of the workflow during the selected time period based on a determination that the control point execution sequence for all instances of the workflow in the selected set of instances has been successfully audited.

20. The method defined in claim 19 further comprising:
generating a hash value for each captured document by applying a hashing function to each received document; and storing each media identifier in the log with a rolling checksum.

21. The method defined in claim 19 wherein interacting with one or more devices to exchange log information comprises actively posting a hash of the log to one or more other logs, recording information in the log about the one or more other logs that interacted with the log to facilitate subsequent verification of log information stored in the log.

* * * * *